(12) United States Patent
Day et al.

(10) Patent No.: US 8,998,323 B2
(45) Date of Patent: Apr. 7, 2015

(54) WARPED-FLOOR TOLERANT AIRCRAFT SEAT

(75) Inventors: Martin S. Day, Colorado Springs, CO (US); Chad R. Pacheco, Colorado Springs, CO (US); Donald R. Pinkal, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 358 days.

(21) Appl. No.: 13/571,084

(22) Filed: Aug. 9, 2012

(65) Prior Publication Data

US 2014/0042273 A1    Feb. 13, 2014

(51) Int. Cl.
*B60N 2/427*    (2006.01)

(52) U.S. Cl.
CPC ............ *B60N 2/427* (2013.01); *B60N 2/42736* (2013.01)

(58) Field of Classification Search
CPC ............................ B60N 2/427; B60N 2/42736
USPC ......................................... 297/344.1, 216.18
See application file for complete search history.

(56) References Cited

U.S. PATENT DOCUMENTS

| | | | |
|---|---|---|---|
| 3,460,791 A | 8/1969 | Judd | |
| 3,531,154 A | 9/1970 | Fleche | |
| 3,622,202 A * | 11/1971 | Brown | 297/344.1 X |
| 4,440,441 A | 4/1984 | Marrujo et al. | |
| 5,283,918 A | 2/1994 | Weingartner et al. | |
| 5,477,572 A | 12/1995 | Weingartner et al. | |
| 5,482,230 A | 1/1996 | Bird et al. | |
| 5,575,629 A | 11/1996 | Olson et al. | |
| 5,632,053 A | 5/1997 | Weingartner et al. | |
| 5,662,376 A | 9/1997 | Breuer et al. | |
| 6,609,753 B2 | 8/2003 | Schmidt-Schaeffer | |
| 6,929,323 B2 | 8/2005 | Enno | |
| 7,581,366 B2 | 9/2009 | Smith et al. | |
| 7,971,939 B2 | 7/2011 | Fujita et al. | |
| 7,988,809 B2 | 8/2011 | Smith et al. | |
| 2002/0060484 A1 | 5/2002 | Schmidt-Schaeffer | |
| 2002/0067031 A1 | 6/2002 | Busgen et al. | |
| 2002/0113476 A1 | 8/2002 | Enno | |
| 2004/0178667 A1 | 9/2004 | Fujita et al. | |
| 2005/0017563 A1 | 1/2005 | Dennis et al. | |
| 2007/0236071 A1 | 10/2007 | Fujita et al. | |
| 2011/0062286 A1 | 3/2011 | Pinkal | |
| 2012/0037262 A1 | 2/2012 | Russell | |

\* cited by examiner

*Primary Examiner* — Anthony D Barfield
(74) *Attorney, Agent, or Firm* — Cantor Colburn LLP

(57) ABSTRACT

A track-mounted aircraft seat has seat track locking pins that are capable of moving independently to remain engaged with the seat track assembly in a warped-floor condition. The seat track locking pins are actuated by means of a pair of torque tubes that rotate independently about a common pilot shaft. A control link, which is operated by the user, acts on a pair of bell cranks each of which acts on one of the torque tubes. The control link is attached to the bell cranks by means of a spherical joint. Because the torque tubes rotate independently and because the spherical joint allows the bell cranks also to move independently, in the event of a warped-floor condition, rotation of one torque tube caused by the skewed seat track will not cause the other torque tube to release its track locking pin.

12 Claims, 4 Drawing Sheets

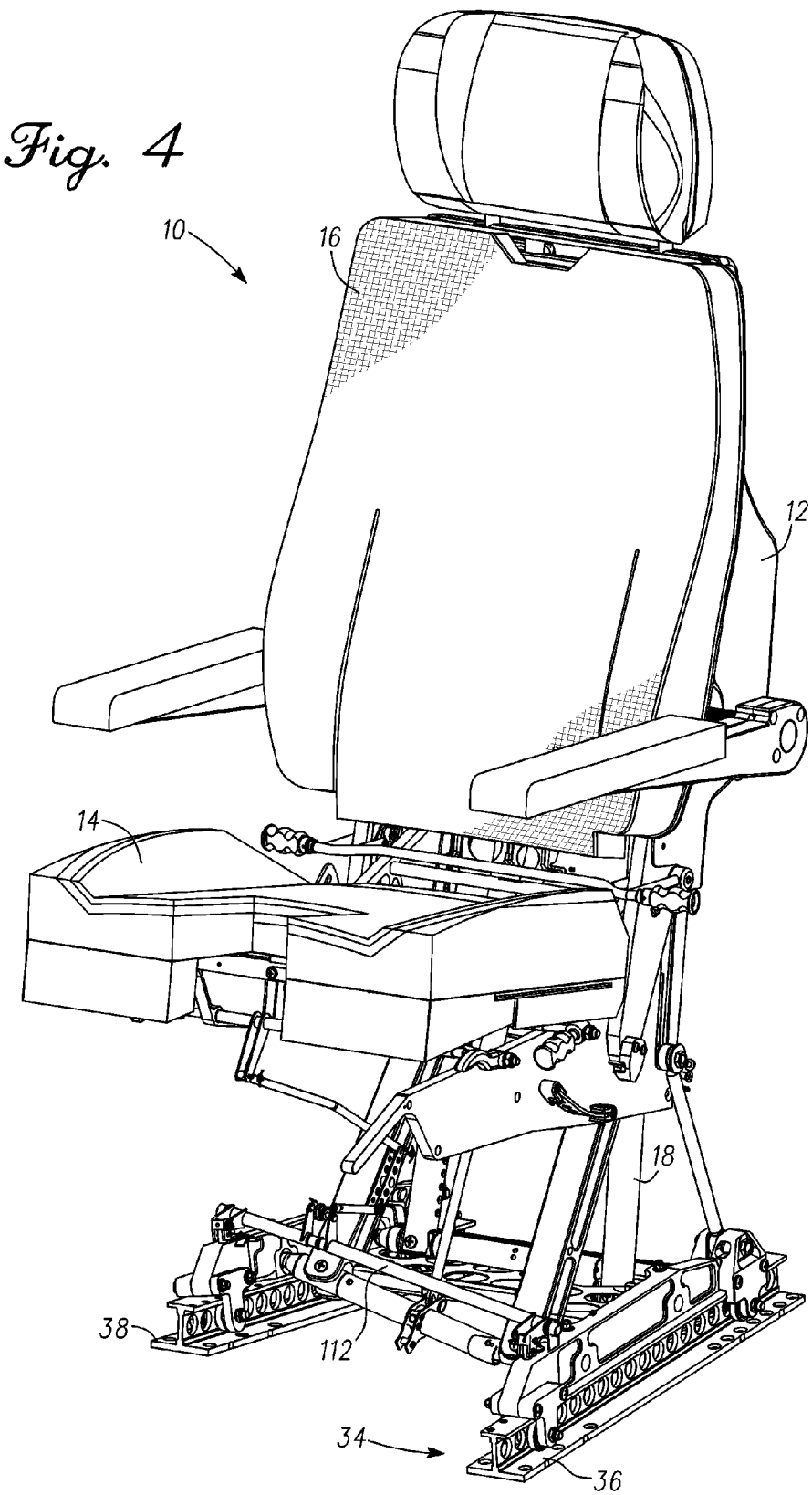

WARPED-FLOOR TOLERANT AIRCRAFT SEAT

BACKGROUND OF THE INVENTION

This invention relates generally to aircraft equipment and, in particular, to aircraft seating.

According to the General Aviation Crash Worthiness Project of the National Transportation Safety Board ("NTSB"), incidents of severe injuries and fatalities in survivable crashes of the general aviation fleet could be significantly improved by the use of energy absorbing seats and occupant restraints. According to one study conducted by the NTSB, many of the seats in the general aviation fleet broke or came off the seat tracks during survivable crashes. In one study, 44% of the occupied seats involved in general aviation crashes became detached from the airplane structure, usually because the seat legs broke or separated from their tracks. In many cases, warping of the cabin floor contributed to the failure of the seat structure.

The U.S. Code of Federal Regulations now requires impact simulation testing of aircrew seating for use in transportation category aircraft. The crash impact testing is performed by subjecting the seat to a simulated horizontal impact with a ground-level obstruction while the floor of the simulated aircraft is in a warped condition. For track mounted seats, which ordinarily have two parallel tracks, the requirement is that the simulated floor be warped so that the track on one side of the seat is skewed 10° vertically and the track on the opposite side is rolled 10° about its longitudinal axis. In many cases, the warped floor causes one of the seat track locking pins to disengage the seat track. This results in an unacceptable increase in the load that must be carried by the sole remaining seat track locking pin. What is needed, therefore, is a track-mounted aircraft seat having a locking mechanism that is capable of accommodating a warped floor during a crash.

SUMMARY OF THE INVENTION

The present invention comprises a track-mounted aircraft seat having seat track locking pins that are capable of moving independently to remain engaged with the seat track in a warped-floor condition. According to an illustrative embodiment, the seat track locking pins are actuated by means of a pair of torque tubes that rotate independently about a common pilot shaft. A control link, which is operated by the user, acts on a pair of bell cranks each of which acts on one of the torque tubes. The control link is attached to the bell cranks by means of a spherical joint. In normal operation, the control link moves the bell cranks in unison so that the seat track locking pins are disengaged simultaneously to permit the seat to be adjusted. However, because the torque tubes rotate independently and because the spherical joint allows the bell cranks also to move independently, in the event of a warped-floor condition, rotation of one torque tube caused by the skewed seat track will not cause the other torque tube to release its track locking pin.

BRIEF DESCRIPTION OF THE DRAWING

The present invention will be better understood from a reading of the following detailed description, taken in conjunction with the accompanying drawing figures in which like references designate like elements and, in which:

FIG. 4 is a front perspective view of the aircraft seat of FIG. 3 with the aircraft floor in a warped condition.

DETAILED DESCRIPTION

Figure 1:
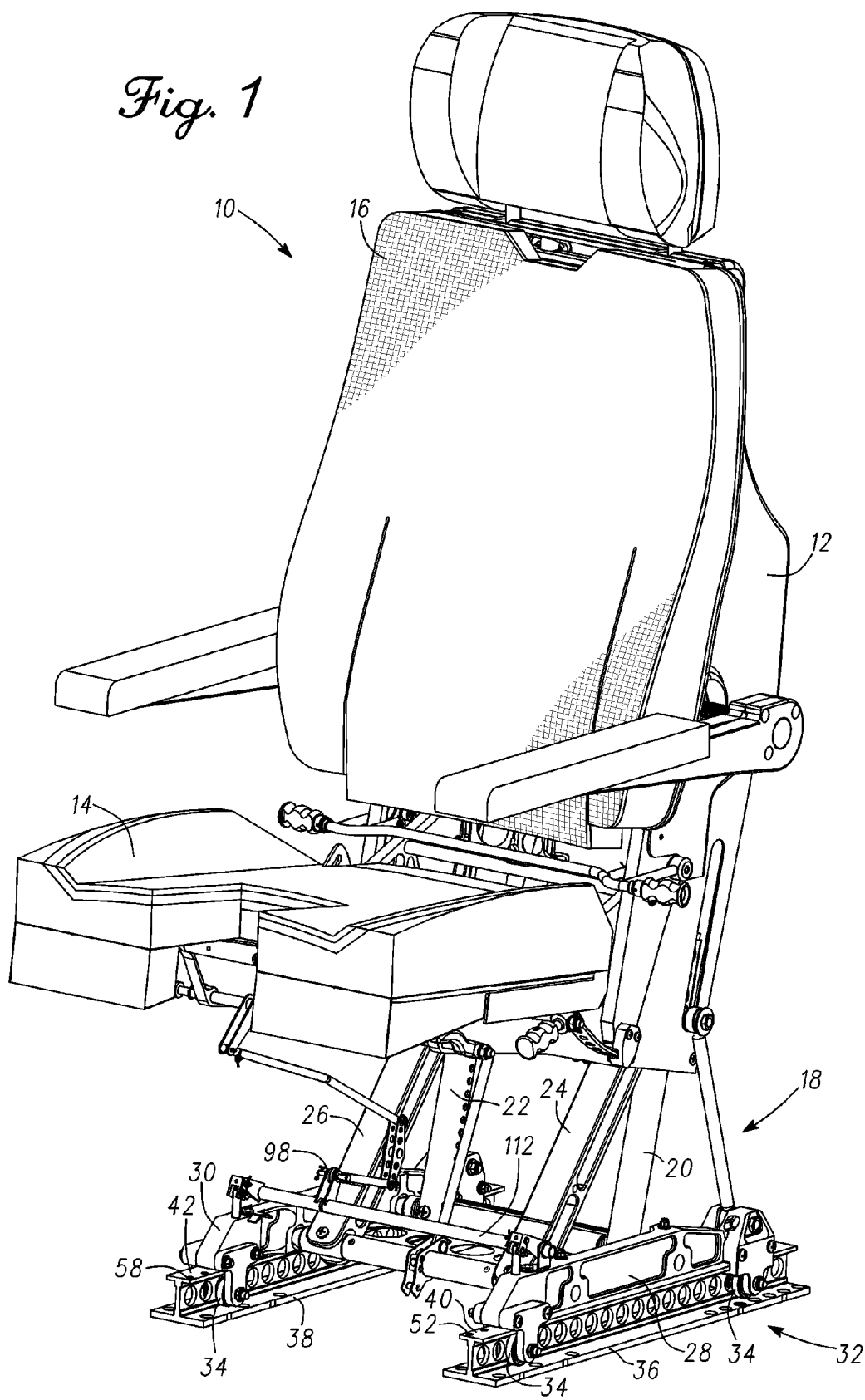
FIG. 1 is a front perspective view of an aircraft seat incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 2:
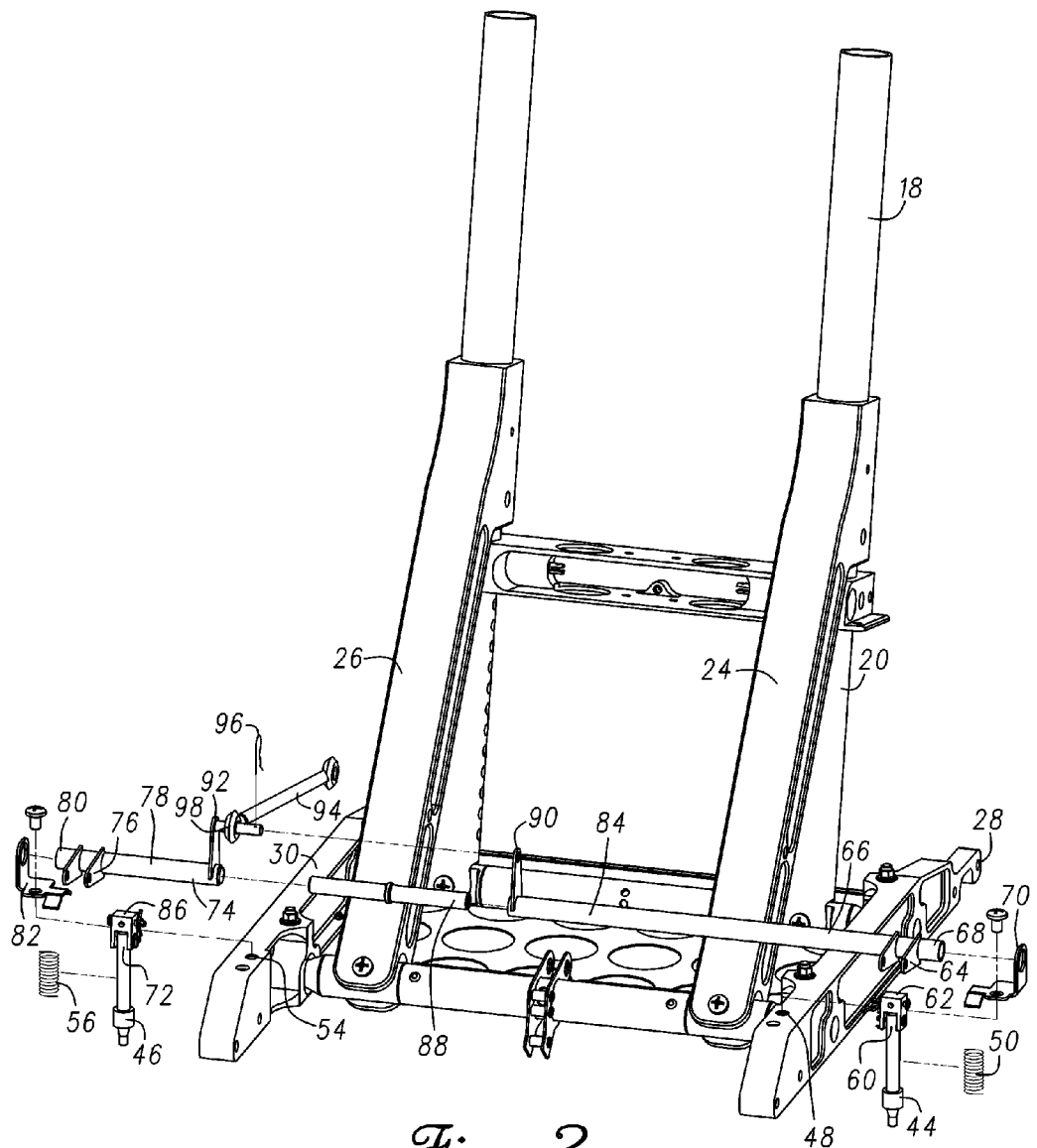
FIG. 2 is an exploded view of a portion of the aircraft seat of FIG. 1.

With reference to FIGS. 1 and 2, an aircraft seat 10 incorporating features of the present invention comprises a seat frame 12 having a seat pan portion 14 and a seat back portion 16. Seat frame 12 further includes a lower support portion 18 comprising rear legs 20, 22 and front legs 24, 26, which terminate at lower support flanges 28 and 30. Aircraft seat 10 is adapted to move along a linear seat track assembly 32 by means of a plurality of wheels 34, which ride on first and second track members 36 and 38 of seat track assembly 32. In the illustrative embodiment of FIG. 1, track member 36 and track member 38 each have a substantially I-shaped cross section and, therefore, the upper surface 40 of first track member 36 and the upper surface 42 of second track member 38 constrain wheels 34 in a vertical direction so that aircraft seat 10 at all times remains attached to seat track assembly 32.

In order to retain aircraft seat 10 in the appropriate position along seat track assembly 32, aircraft seat 10 is provided with first and second locking pins 44, 46. Locking pin 44 is recessed within a cavity 48 formed in lower support flange 28. A resilient member such as helical compression spring 50 urges locking pin 44 downward out of cavity 48 to engage one of a plurality of apertures 52 formed in upper surface 40 of track member 36. Locking pin 46 is similarly recessed within a cavity 54 formed in lower support flange 30. A resilient member such as helical compression spring 56 similarly urges locking pin 46 downward out of cavity 54 to engage one of a plurality of apertures 58 formed in upper surface 42 of track member 38.

The upper end 60 of locking pin 44 is attached to a clevis 62, which in turn is attached to actuator bell crank 64. Actuator bell crank 64 is attached to a torque tube 66 which is supported for rotation at its outer end 68 by means of a bearing support 70. The upper end 72 of locking pin 46 is similarly attached to a clevis 74, which in turn is attached to actuator bell crank 76. Actuator bell crank 76 is attached to a torque tube 78 which is supported for rotation at its outer and 80 by means of bearing support 82. The inner ends 84 and 86 of torque tubes 66 and 78 are assembled together by sliding inner ends 84 and 86 over pilot shaft 88 to form a shaft assembly 112. The clearance between the inner diameters of torque tubes 66, 78 and the outer diameter of pilot shaft 88 is controlled so that shaft assembly 112 forms a relatively rigid shaft axially and radially, while permitting torque tubes 66 and 78 to rotate independently about a common longitudinal axis.

Figure 3:
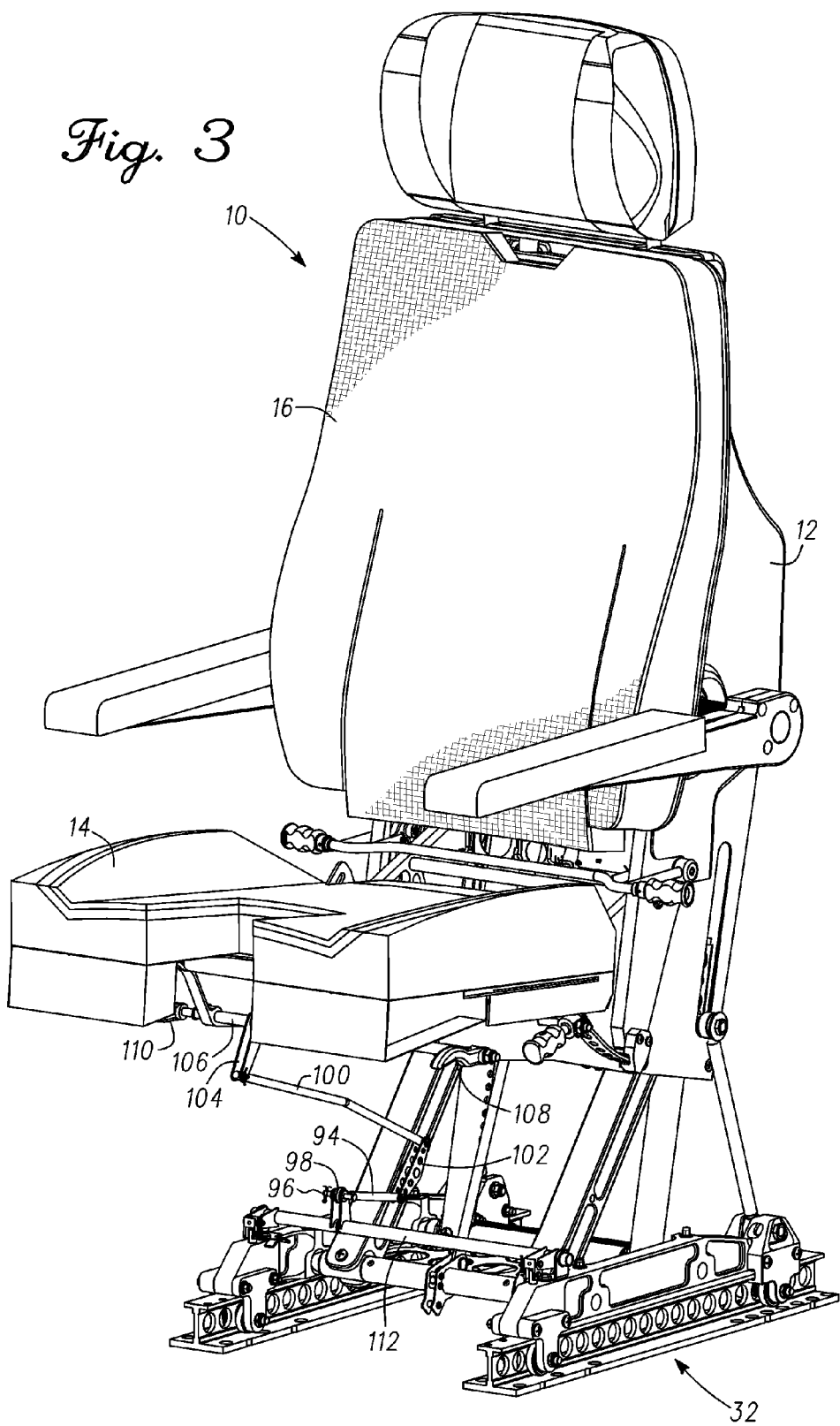
FIG. 3 is a front perspective view of the aircraft seat of FIG. 1 with the seat track locking pins engaged.

With additional reference to FIG. 3, torque tube 66 includes an input bell crank 90 attached at inner end 84. Torque tube 78 similarly includes an input bell crank 92 attached at inner end 86. Input bell cranks 90 and 92 are connected to a control link 94 by means of a clevis pin 96 which passes through a spherical joint 98 attached to control link 94. For reasons that will be explained more fully hereinafter, clevis pin 96 is significantly longer than the span between input bell cranks 90 and 92.

Control link 94 is connected to an input link 100 via a rocker arm 102 mounted to lower support portion 18 of seat frame 12. Control link 94, in turn, is connected to control bell crank 104 which is attached to control shaft 106. In normal operation, the user rotates control handle 108 or control handle 110 which rotates control shaft 106 thereby moving control shaft 106 and with it input link 100, rocker arm 102, and control link 94. Control link 94, in turn acts on input bell cranks 90 and 92 to rotate torque tubes 66 and 78 thereby lifting locking pins 44 and 46 to release aircraft seat 10 to move along the track 32. When control handle 108 or 110 is released, springs 50 and 56 move locking pins 44 and 46 back into registry with apertures 52 and 56 to lock aircraft seat 10 in position.

Although control link 94 is attached to input bell cranks 90 and 92 via spherical joint 98, in normal operation spherical joint 98 does not rotate and therefore input bell crank 90 and input bell crank 92 move in unison. It should be observed, however, that because spherical joint 98 is present, control link 94 provides essentially a differential input to input bell cranks 90 and 92, such that for a given displacement of control link 94, the sum of the displacements of input bell cranks 90 and 92 is fixed. Thus, for example, if locking pin 44 is jammed, locking pin 46 will move twice as far for a given displacement of control link 94. As explained more fully hereinafter, it is this differential input that enables the locking pins of aircraft seat 10 to remain engaged with seat track assembly 32 in spite of a warped floor.

FIG. 4 illustrates aircraft seat 10 in the locked position in a simulated warped-floor condition with seat track 34 warped so that the upper surface 42 of track member 38 is rotated away from track member 36 by 10° and track member 36 is skewed downward by 10° relative to track member 38. As can be seen from an inspection of FIG. 4, although the rotation of track member 38 about its longitudinal axis causes shaft assembly 112 to elongate, because pilot shaft 88 is a slip-fit with torque tubes 66 and 78, shaft assembly 112 can elongate without placing any stress on the components. Similarly, since clevis pin 96 is significantly longer than the original span between input bell crank 90 and input bell crank 92, shaft assembly 112 can elongate without placing any bending stress on input bell crank 90 or input bell crank 92.

As can also be seen from an inspection of FIG. 4, the downward skewing of track member 36 would ordinarily cause locking pin 44 to be withdrawn from registry with its corresponding aperture 52 if shaft assembly were torsionally rigid. Because torque tubes 66 and 78 are free to rotate independently about their common longitudinal axis, however, and because spherical joint 98 is free to rotate to accommodate the independent rotation of torque tubes 66 and 78, the downward skewing of track member 36 does not cause locking pin 44 to be withdrawn from registry. Accordingly, aircraft seat 10 remains locked in position by both seat locking pins 44 and 46, thereby significantly improving the impact performance over prior art seats.

Although certain illustrative embodiments and methods have been disclosed herein, it will be apparent from the foregoing disclosure to those skilled in the art that variations and modifications of such embodiments and methods may be made without departing from the invention. For example, alternative methods of providing a differential input to torque tubes 66 and 78 are considered within the scope of the invention, such as use of a rocker arm attached to the end of control link 94, or a cable attached between the input bell cranks passing over a pulley attached to the end of control link 94. Similarly, although torque tubes 66 and 78 in the illustrative embodiment are hollow tubular forms to save weight, the torque tubes are not necessarily tubes, but may be solid shafts or other structural members. Accordingly, it is intended that the invention should be limited only to the extent required by the appended claims and the rules and principles of applicable law. Additionally, as used herein, references to direction such as "up" or "down" are intend to be exemplary and are not considered as limiting the invention and, unless otherwise specifically defined, the terms "substantially" or "approximately" when used with mathematical concepts or measurements mean within ±10 degrees of angle or within 10 percent of the measurement, whichever is greater.

What is claimed is:

1. A seat for use in an aircraft having a seat track assembly adapted to permit the seat to move along the seat track assembly, the seat track assembly having a plurality of apertures adapted to be engaged by a plurality of moveable locking pins to selectively lock the seat in position along the seat track assembly, the seat comprising:
   a seat frame having a seat pan portion and a seat back portion;
   first and second locking pins carried on the seat frame, the first and second locking pins being moveable into an engaged position in which the first and second locking pins engage the plurality of apertures in the seat track assembly to lock the seat in a predetermined position along the seat track assembly, the first and second locking pins being further moveable to a disengaged position in which the first and second locking pins disengage the plurality of apertures to permit the aircraft seat to be moved along the seat track assembly;
   a first actuator arm for moving the first locking pin from the engaged position to the disengaged position;
   a second actuator arm for moving the second locking pin from the engaged position to the disengaged position, the first and second actuator arms being capable of independent movement to move the first and second locking pins independently; and
   a control link adapted to be moved by a user, the control link providing a differential input to the first and second actuator arms such that the sum of the displacement of the first and second actuator arms is fixed for a given displacement of the control link;
   wherein: the seat track assembly comprises first and second seat track members; and
   the control link is operatively attached to the first and second actuator arms by a rotating joint, the rotating joint permitting the first and second locking pins to remain in the engaged position as the first and second seat track members move from a parallel to a skewed configuration.

2. The seat of claim 1, wherein:
   the first actuator arm comprises a first torque tube having a first input bell crank and a first actuator bell crank; and
   the second actuator arm comprises a second torque tube having a second input bell crank and a second actuator bell crank, the first and second torque tubes pivoting independently about a common pivot axis.

3. The seat of claim 2, wherein:
   the seat track assembly comprises first and second seat track members; and the first and second torque tubes telescope along the common pivot axis as the first and second seat track members move from a proximal to a distal position.

4. The seat of claim 3, wherein:
the control link is operatively attached to the first and second actuator arms by a rotating joint including an elongate clevis pin that remains operatively engaged with the first and second torque tubes as the first and second seat track members move from the proximal to the distal position.

5. The seat of claim 1, wherein:
the first and second locking pins are spring-loaded into the engaged position.

6. The seat of claim 1, further comprising:
an input link operatively attached to the control link via a rocker arm.

7. A seat for use in an aircraft having a seat track assembly adapted to permit the seat to move along the seat track assembly, the seat track assembly comprising first and second seat track members, the seat track assembly further comprising a plurality of apertures adapted to be engaged by a plurality of moveable locking pins to selectively lock the seat in position along the seat track assembly, the seat comprising:
a seat frame having a seat pan portion and a seat back portion;
first and second locking pins carried on the seat frame, the first and second locking pins being moveable into an engaged position in which the first and second locking pins engage the plurality of apertures in the seat track assembly to lock the seat in a predetermined position along the seat track assembly, the first and second locking pins being further moveable to a disengaged position in which the first and second locking pins disengage the plurality of apertures to permit the aircraft seat to be moved along the seat track assembly;
a first actuator arm comprising a first torque tube having a first input bell crank and a first actuator bell crank, the first actuator bell crank being operatively attached to the first locking pin;
a second actuator arm comprising a second torque tube having a second input bell crank and a second actuator bell crank, the second actuator bell crank being operatively attached to the second locking pin, the first and second torque tubes pivoting independently about a common pivot axis;
a control link adapted to be moved by a user, the control link operatively attached to the first and second input bell cranks via a pivoting joint for urging the first and second input bell cranks to move the first and second locking pins from the engaged position to the disengaged position.

8. The seat of claim 7, wherein:
the flexible link pivots to permit the first and second locking pins to remain in the engaged position as the first and second seat track members move from a parallel to a skewed configuration.

9. The seat of claim 7, wherein:
the flexible link provides a differential input to the first and second input bell cranks such that the sum of the displacement of the first and second input bell cranks is fixed for a given displacement of the control link.

10. The seat of claim 7, wherein:
the first and second torque tubes telescope along the common pivot axis as the first and second seat track members move from a proximal to a distal position.

11. The seat of claim 7, wherein:
the first and second locking pins are spring-loaded into the engaged position.

12. The seat of claim 7, further comprising:
An input link operatively attached to the control link via a rocker arm.

* * * * *